United States Patent Office 3,350,715
Patented Oct. 31, 1967

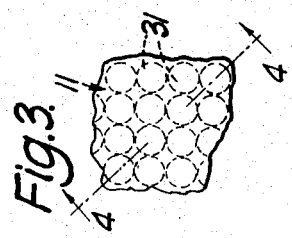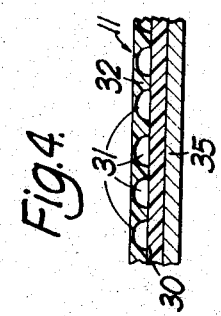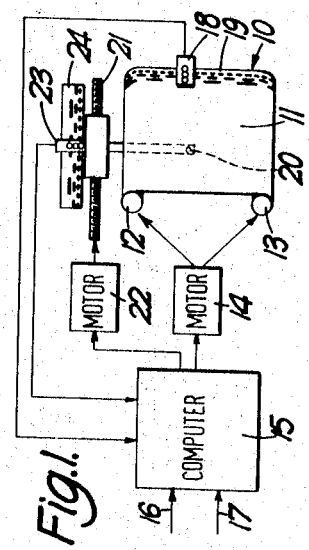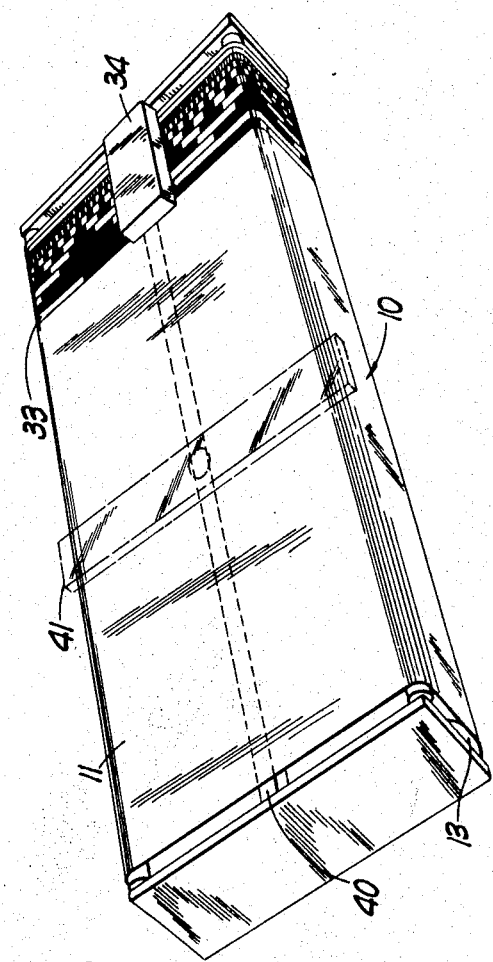

3,350,715
AUTOMATIC CHART POSITION DISPLAY APPARATUS
George Frederick King and Alan Laurence Wigzell, London, England, assignors to Decca Limited, London, England, a British company
Filed Oct. 20, 1966, Ser. No. 588,107
Claims priority, application Great Britain, May 3, 1966, 19,530/66
4 Claims. (Cl. 346—17)

This invention relates to automatic chart position display apparatus of the kind in which a marker is movable, relative to a chart, in two co-ordinate directions, in accordance with changes in the position of a craft, determined for example by a radio navigation system.

Automatic chart position display apparatus is widely used on aircraft, particularly in conjunction with phase comparison radio navigation systems which enable the position of the aircraft to be determined to a very high degree of accuracy. Usually the chart is driven in one direction by being traversed between spools or rollers whilst a marker device is movable transversely across the chart. It is an object of the present invention to provide an improved form of display apparatus which enables the marker to be positioned on the underside of the chart, thereby avoiding any obstruction of the view of the chart yet which can be used over a wide range of conditions of illumination. This is particularly important in an aircraft since the chart may have sometimes to be viewed in very bright sunlight whereas, at night time, it may be essential to keep any ambient illumination to a very low level.

According to this invention, in automatic chart display apparatus having a chart which is traversed in one direction and a chart marker movable across the chart in a transverse direction, the chart marker is arranged behind the chart and the chart is formed of a film of transparent plastic material, conveniently polyethylene terephthalate material such as that sold under the trade name "Mylar," which film has on one surface a whitener arranged as a dotted screen in a regular pattern, the whitener being covered with a hardened coating having a smooth surface and a balancer coating or coatings having a hard smooth surface being provided on the other face of the film, one of said coatings being a photographic emulsion carrying an image of a digital control track for photo-electric sensing of the position of the chart in the direction in which it is traversed.

The use of the film of plastic material, particularly polyethylene terephthalate, provides a high degree of dimensional stability in variable atmospheric conditions. This is very necessary if the high accuracy of radio frequency phase comparison navigation systems is to be fully utilised. The film typically would be of the order of 0.001–0.003 inch thick. Polyethylene terephthalate film is, in its natural state, transparent and cannot therefore be used because the parts of the apparatus behind the film would be clearly visible. This difficulty is overcome by making the film translucent using a whitener. By arranging the whitener in a dotted screen, a substantial portion of any bright incident light e.g. bright sunlight, is absorbed and not reflected or scattered back towards the eye of the observer. This manner of making the chart translucent thus permits of viewing of information printed on the top surface of the chart in a wide range of ambient light conditions. Preferably the whitener is on the upper surface and is covered with a photographic emulsion which may be used for photographically printing the information to appear on the chart. The use of a photographic emulsion permits of the effective formation of binary coded information which can be sensed photoelectrically. The dotted screen whitener has necessarily a non-smooth surface making it very difficult or impossible to apply any completely opaque coating using an inking technique but by using a photographic emulsion, particularly a multi-layer emulsion it becomes possible to produce markings which are substantially completely impervious to visible light and infra-red radiation; the latter is important because present-day photo-resistive cells, particularly cadmium sulphide cells, have a high sensitivity in the infra-red region.

The marking on the reverse side of the chart is conveniently effected with a typewriter ribbon together with a suitable marking element which is actuated when a mark is required. Usually the marker will be operated periodically to give a series of marks showing the track of the vehicle. By giving the balancing coating a hardened smooth surface, it is possible to put on an ink marking which can be wiped off when no longer required. The markings are visible through the chart but the viewer will not see the apparatus behind the chart and spaced therefrom.

The following is a description of one embodiment of the invention, reference being made to the accompanying drawings in which:

FIGURE 1 is a block diagram for explaining the operation of the chart display apparatus;

FIGURE 2 is a perspective view of a chart display unit;

FIGURE 3 is a plan view, to a greatly enlarged scale of part of a chart showing the pattern of dots formed of whitener material; and FIGURE 4 is a section through the chart material along the line 4—4 of FIGURE 3.

Referring to FIGURE 1, there is shown diagrammatically a chart display unit 10 having a long strip 11 constituting at least one chart and usually comprising a series of charts which may be to different scales. This strip is carried on spools 12, 13 and can be traversed as required in either direction by a drive motor 14 under the control of a computer 15. This computer has inputs 16, 17 from one or more radio or other navigation systems and, for controlling the lengthwise position of the chart strip 11, makes use of a photo-sensing unit 18 sensing digital markings 19 along the edge of the strip. Underneath the chart is a marker pen 20 which is traversed across the chart by a lead screw 21 driven by a motor 22 controlled by the computer. The position of the marker pen is sensed by a sensing unit 23 co-operating with fixed digital markings 24. The computer compares the actual position of the marker, as represented by the outputs from the sensing units 18, 23, with the co-ordinates representing the actual position of the vehicle and controls the motors 14, 22 to bring the marker to the required position to be indicated.

The present invention is concerned more particularly with the display unit 10 and the chart strip 11. This unit may have to be viewed in widely varying conditions of ambient light, e.g. from bright sunlight to dim nightlighting. The marker 20 is beneath the chart to avoid obscuring chart information but the marker mechanism should not be visible through the chart. The chart is therefore made translucent. It is essential however to avoid reflecting bright incident light, such as sunlight. To meet these requirements, the chart strip 11 is formed, as shown in FIGURES 3 and 4, of a transparent strip 30 of polyethylene terephthalate material polished on both faces and having on its top surface a regular pattern of fine dots of whitener material 31. These dots in this particular embodiment are circular in shape and arranged with adjacent dots just touching one another as shown in FIGURE 3. The dots may conveniently be painted on to the strip 30 using an engraved metal printing roller. The dots are of a size such as to be individually imperceptible to the naked eye.

This pattern of dots is covered by a high density silver image photographic emulsion 32 which gives a smooth top surface to the chart strip. The photographic emulsion carries an image of a digital control track 33 (FIGURE 2) for the photo-electric sensing of the position of the chart in the direction in which it is traversed. In the construction illustrated in FIGURE 2, the photo-cells of the sensing unit 18 are arranged underneath the strip 11 and a light source 34 is positioned above the chart for illuminating the photo-cells through the digit tracks 33.

The underside of the chart is covered with a balancing coating 35 (FIGURE 4) which has a hard smooth surface. The primary purpose of this coating 35 is to prevent curling of the strip during the various processing operations. The balancing coating may thus be made similar to the coating 32 but this is not essential. The balancing coating has to be marked by the marker 20. As shown in FIGURE 2, a typewriter ribbon 40 extends across the chart strip and the marker 20 (not shown in FIGURE 2) strikes the underside of the ribbon forcing the ribbon and chart against the underside of a transparent polymethyl methacrylate strip 41 which is traversed across the chart with the marker 20. Typically the marker would be operated repetitively, the time intervals being made so short that the successive marks form a continuous line constituting a record of the track of the vehicle. By making a hard smooth surface on the balancing coating 35, the ink markings can be wiped off when no longer required. Thus the chart strips can be re-used.

We claim:
1. In automatic chart display apparatus, a chart, means for traversing the chart in one direction and a chart marker movable across the chart in a transverse direction, said chart marker being arranged behind the chart and said chart being formed of a film of transparent plastic material, which film has on one surface a whitener arranged as a dotted screen in a regular pattern, the whitener being covered with a hardened coating having a smooth surface, said film having on its other surface a balancer coating having a hard smooth surface, one of said coatings being a photographic emulsion carrying an image of a digital control track for photo-electric sensing of the position of the chart in the direction in which it is traversed.
2. Automatic chart display apparatus as claimed in claim 1 wherein said film is formed of polyethylene terephthalate.
3. Automatic chart display apparatus as claimed in claim 1 wherein the whitener is on the front surface of the chart and is covered by the photographic emulsion.
4. Automatic chart display apparatus as claimed in claim 1 wherein the chart marker comprises a typewriter ribbon extending across the chart and a movable marker member arranged for striking the ribbon against the underside of the chart.

References Cited
UNITED STATES PATENTS 3,113,313  12/1963  Roberts _____ 346—32

RICHARD B. WILKINSON, *Primary Examiner.*

J. W. HARTARY, *Assistant Examiner.*